United States Patent [19]

Hattori et al.

[11] Patent Number: 4,790,214

[45] Date of Patent: Dec. 13, 1988

[54] REVOLUTION SPEED RATIO CONTROL SYSTEM FOR A CONTINUOUSLY VARIABLE TRANSMISSION

[75] Inventors: Katsuhiko Hattori; Hideyuki Suzuki; Hiroyuki Yamaguchi; Takeo Ogasawara, all of Aichi, Japan

[73] Assignee: Kabushiki Kaisha Toyota Chuo Kenkyusho, Aichi, Japan

[21] Appl. No.: 890,651

[22] Filed: Jul. 29, 1986

[30] Foreign Application Priority Data

Aug. 2, 1985 [JP] Japan .................................. 60-170933

[51] Int. Cl.[4] ............................................ B60K 41/16
[52] U.S. Cl. ........................................ 74/866; 74/867
[58] Field of Search .................. 74/866, 867, 869, 689

[56] References Cited

U.S. PATENT DOCUMENTS

| | | | |
|---|---|---|---|
| 4,035,105 | 7/1977 | Dantlgraber | 417/220 |
| 4,325,215 | 4/1982 | Yamamoto | 417/220 X |
| 4,387,608 | 6/1983 | Mohl et al. | 74/866 |
| 4,594,916 | 6/1986 | Ito et al. | 74/867 X |
| 4,665,773 | 5/1987 | Hiramatsu et al. | 74/867 X |
| 4,669,336 | 6/1987 | Okada et al. | 74/867 |
| 4,672,863 | 6/1987 | Itoh et al. | 74/866 |
| 4,680,987 | 7/1987 | Morimoto | 74/866 |
| 4,680,990 | 7/1987 | Ohgami | 74/866 X |
| 4,683,779 | 8/1987 | Osanai et al. | 74/866 X |
| 4,685,357 | 8/1987 | Sawada et al. | 74/867 |

FOREIGN PATENT DOCUMENTS

| | | |
|---|---|---|
| 0104033 | 3/1984 | European Pat. Off. . |
| 2141722 | 3/1973 | Fed. Rep. of Germany ...... 417/220 |
| 2097060 | 10/1982 | United Kingdom ................ 417/220 |
| 2151705 | 7/1985 | United Kingdom ................ 417/220 |

Primary Examiner—Leslie A. Braun
Assistant Examiner—Dwight G. Diehl
Attorney, Agent, or Firm—Berman, Aisenberg & Platt

[57] ABSTRACT

An electronic control circuit calculates the actual revolution speed ratio between the driving and driven pulleys of the transmission, generates a first electric control signal corresponding to the difference between the actual revolution speed ratio and an aimed revolution speed ratio predetermined for both the pulleys in conjunction with the input torque of the input shaft and required torque for the output shaft, and generates a second electric control signal made of the sum of both an electric signal corresponding to the actual revolution speed ratio and an electric signal corresponding to the difference. A hydraulic control circuit includes a pressure oil source, a first cylinder which is provided on the input shaft and supplied with working oil from the pressure oil source to push a movable member of a driving pulley toward a fixed member thereof, a second cylinder which is provided on the output shaft and supplied with working oil from the pressure oil source to push a movable member of a driven pulley toward a fixed member thereof, a first control valve which is disposed in an oil passage for connecting the pressure oil source and a first cylinder to each other and acts on the basis of the first electric control signal to control the flow rate of the working oil supplied to or drained from the first cylinder, and a second control valve which is disposed in an oil passage for connecting the pressure oil source and the second cylinder to each other and acts on the basis of the second electric control signal to control the pressure of the working oil supplied to the second cylinder.

13 Claims, 6 Drawing Sheets

REVOLUTION SPEED RATIO CONTROL SYSTEM FOR A CONTINUOUSLY VARIABLE TRANSMISSION

BACKGROUND OF THE INVENTION

The present invention relates to a revolution speed ratio control system for a continuously or infinitely speed variable transmission which comprises a driving pulley, a driven pulley and an endless belt wound on both the pulleys and is used for a machine tool, a conveyor, a vehicle or the like.

A continuously variable transmission for a machine tool, a conveyor, a vehicle or the like is well known. In the continuously variable transmission, a driving pulley is provided on a driving shaft, a driven pulley is provided on a driven shaft, and an endless belt is wound on both the pulleys. Each of the pulleys comprises a fixed member secured to the shaft and having a conical surface whose vertex is located on the axis of gyration of the shaft, a movable member slidable in the direction of the axis of gyration of the shaft and having a conical surface whose vertex is located on the axis and which faces the conical surface of the fixed member, and a hydraulic cylinder secured to the shaft so as to push the movable member toward the fixed member. The endless belt is pinched between the conical surfaces of the fixed and the movable members to transmit motive power between both the pulleys. The ratio of the revolution speed of the driven shaft to that of the driving shaft can be altered in a continuous or infinite manner by changing the radial position of the endless belt on each of the pulleys.

The revolution speed ratio of the continuously variable transmission depends on the ratio of the running diameter of the endless belt on the driving pulley to that of the endless belt on the driven pulley. The speed ratio also depends on the clamp force (hereinafter referred to as the thrust to the belt) of the fixed and movable members of the driving pulley, which is to be applied to the belt. If an input torque and an RPM of the driving shaft are kept constant, the speed ratio can be kept constant where the thrusts of the driving and the driven pulley balance with each other. A hydraulic control circuit provided for the continuously variable transmission comprises a pump, a pressure control valve which functions so that the pressure of oil discharged from the pump and fed to a main oil passage is controlled to a prescribed level (referred to as line pressure), a revolution speed ratio control valve which is provided between the main oil passage and a first oil passage to the hydraulic cylinder or drains the oil from the cylinder to alter the pressure in the cylinder, a second oil passage for directly feeding the oil of the line pressure from the main oil passage to the driven pulley, and a revolution speed ratio feedback means in which the position of the movable member of the driven pulley is mechanically detected and the quantity of the displacement of the spring of the pressure control valve is regulated by a linkage to provide the line pressure with a component corresponding to the speed ratio. The speed ratio control valve is regulated by a control signal supplied from an electronic control circuit, to control the speed ratio.

The oil pressure applied to the hydraulic cylinder of the driving pulley is altered to break the balance of the thrusts of the driving and the driven pulleys to change the output speed of the conventional continuously variable transmission. The hydraulic cylinder of the driven pulley is directly connected to the main oil passage, while a balance breaking thrust is caused exclusively by the driving pulley.

When the oil pressure applied to the hydraulic cylinder of the driving pulley is increased as the thrusts of the driving and the driven pulleys to the endless belt wound thereon are in balance with each other, the continuously variable transmission is put into a higher output speed position. When the oil pressure is decreased as the thrusts are in balance with each other, the transmission is put into a lower output speed position. Since the transmission of motive power between each pulley and the endless belt is performed by the frictional force between the pulley and the belt, the thrust acting to the belt is determined by the relationship between the area and pressure of the contact of the pulley and the belt. For that reason, in order to heighten the motive power transmission efficiency of the stepless transmission, the contact surface pressure between each pulley and the belt needs to be kept at a prescribed level.

When the ratio of the revolution speed of the driven pulley to that of the driving pulley increases, the area of contact of the driven pulley and the endless belt decreases. At that time, the line pressure in the main oil passage is decreased by the speed ratio feedback means so that the thrust of the driven pulley to the belt is reduced. For that reason, a thrust control range for obtaining a desired speed ratio by controlling the thrust of the driving pulley through the control of the pressure in the hydraulic cylinder of the driving pulley is made narrow. As a result, it takes a long speed change time for a conventional control system to obtain a predetermined speed ratio. Therefore, the speed response of the conventional continuously variable transmission is not always good. The line pressure could be heightened in order to increase the thrust of the driven pulley in a higher output speed position of the continuously variable transmission to improve the speed responsibility. In that case, however, the contact surface pressure between the endless belt and the driven pulley in the higher output speed position of the transmission could tend to be much higher than that between the belt and the driving pulley because of the relationship between the running diameters of the belt on the pulleys so as to accelerate the fatigue and wear of the belt and the driven pulley to shorten their service lives.

In the prior art, a differential cylinder system is adopted in order that the absolute value of the difference between the thrusts of the driving and the driven pulleys in the higher output speed position of the continuously variable transmission is equal to that in the lower output speed position thereof. In the system, the cross-sectional area of the piston of the hydraulic cylinder of the driving pulley is made twice as much as that of the piston of the hydraulic cylinder of the driven pulley. When the contact surface pressure between the endless belt and each pulley is higher than a limit, a high resistance is caused to the separation of the belt from the pulley to drop the efficiency of the continuously variable transmission. When the contact surface pressure is lower than a limit, the frictional force between the endless belt and the pulley is too low to transmit prescribed motive power, namely, the belt slips relative to the pulley. Since the transmission of motive power depends on both the frictional force between the endless belt and each pulley or the oil pressure applied to the hydraulic cylinder of the pulley and the diameter of the belt running on the pulley and the speed ratio (running diameter ratio) depends on the difference between the thrusts of the pulleys, the cross-sectional area of the hydraulic cylinder of the driving pulley needs to be made about twice as much as that of the hydraulic cylinder of the driven pulley if the difference between the thrusts of the pulleys is to be made effective with the limited cross-sectional areas of the hydraulic cylinders. This hinders the reduction in the size and weight of the continuously variable transmission.

SUMMARY OF THE INVENTION

According to the present invention, a first control valve for regulating the flow rate of working oil or hydraulic fluid supplied to the hydraulic cylinder of a driving pulley, and a second control valve for regulating line pressure applied to the hydraulic cylinder of a driven pulley for speed change responsibility and tension control are provided. In addition, a means for calculating the actual ratio of the revolution speed of the driven pulley of a continuously variable transmission to that of the driving pulley thereof is provided in conjunction with an electronic control circuit means. A first electric control signal corresponding to the difference between the actual speed ratio and a predetermined target ratio is applied to regulate the flow rate of the working oil by the first control valve. An electric signal corresponding to the sum of a control reference quantity predetermined depending on the change in the actual speed ratio and a response improving correction quantity predetermined depending on the change in the difference between the actual revolution speed ratio and the predetermined aimed ratio is applied to regulate the pressure of working oil by the second control valve. As a result, the delay in speed change response is diminished, and minimum necessary contact surface pressure is maintained between an endless belt and each of the pulleys in operation at the fixed revolution speed ratio, so that the size and weight of the continuously variable transmission can be reduced According to the present invention, when the revolution speed ratio of a continuously variable transmission comprising a driving pulley, a driven pulley and an endless belt running on the pulleys is to be controlled, a first electric control signal corresponding to the difference between an actual value corresponding to the actual speed ratio between both the pulleys and turget value corresponding to a predetermined target speed ratio between the pulleys is applied to a first control valve to regulate the thrust of the driving pulley depending on the aimed value. Pressure corresponding to a second electric control signal made of the sum of both an electric signal corresponding to the actual value and an electric signal corresponding to the difference between the actual value and the target value is caused in the second cylinder of the driven pulley by a second control valve to regulate the pressure in the second cylinder positively and alone. As a result, the response in the speed change to the target value is quickened. Since the pressure in the second cylinder is controlled, the pressure of working ol in a hydraulic control circuit is not all changed but the pressure in a second cylinder chamber is controlled alone when the revolution speed ratio of the continuously variable transmission is to be decreased. Consequently, the thrust between the endless belt and each pulley is controlled to a necessary minimum level so that a slippage is avoided, a mechanical loss is minimized, and the drivability to cope with a sudden geographical change etc. is enhanced. For that reason, the open cross-sectional area of the first cylinder of the driving pulley can be made 1.1 to 1.6 times, preferably 1.3 to 1.45 times, as much as that of the second cylinder of the driven pulley.

Since the pressure of a pressure oil source is directly introduced into the cylinder of driven pulley in the prior art, the thrust of the driven pulley is directly affected by pressure inversely proportional to the revolution speed ratio between a driving pulley and the driven pulley. For that reason, the thrust of the driven pulley needs to be made high in order to maintain a certain degree of speed change response. When a continuously variable transmission is downshifted (the thrust of the driving pulley is reduced to decrease the revolution speed ratio), a desired revolution speed ratio cannot be achieved within a preferable short time because the difference between the thrusts of the driving and the driven pulleys cannot be made large.

According to the present invention, working oil supplied from a pressure oil source to the cylinders of driving and driven pulleys is regulated by a first control valve for the cylinder of the driving pulley and a second control valve for the cylinder of the driven pulley, separately, so that the pressure in the cylinder of the driven pulley can be altered depending on the operating condition of a continuously variable transmission. For that reason, the pressure of the working oil supplied to the cylinder of the driven pulley can be regulated alone by the second control valve without reducing the pressure of the working oil supplied to the cylinder of the driving pulley and affecting the thrust of the driving pulley, so as to freely impart a necessary thrust to the driven pulley. In the operation of the continuously variable transmission at a fixed revolution speed ratio, if the cylinders of the driven pulleys in the prior art and the present invention have the same pressure reception area, the pressure of the working oil supplied to the cylinder of the driven pulley can be made lower in the present invention than in the prior art, to minimize the initial tension of the endless belt of the continuously variable transmission and the contact surface pressure between the belt and the pulley in the present invention to reduce the fatigue, wear and the like of the belt and the pulley to lengthen their lives and diminish a mechanical loss between them. In the transient operation of the continuously variable transmission at a changing revolution speed ratio, a pressure change corresponding to a response delay at the time of speed change and caused in the pressure in the cylinder of the driven pulley can be added to an speed changing operation performed by altering the thrust of the driving pulley, so as to let the alteration of the thrust of the driven pulley participate in speed changing.

DETAILED DESCRIPTION OF THE PREFERRED EMBODIMENTS

Figure 1:
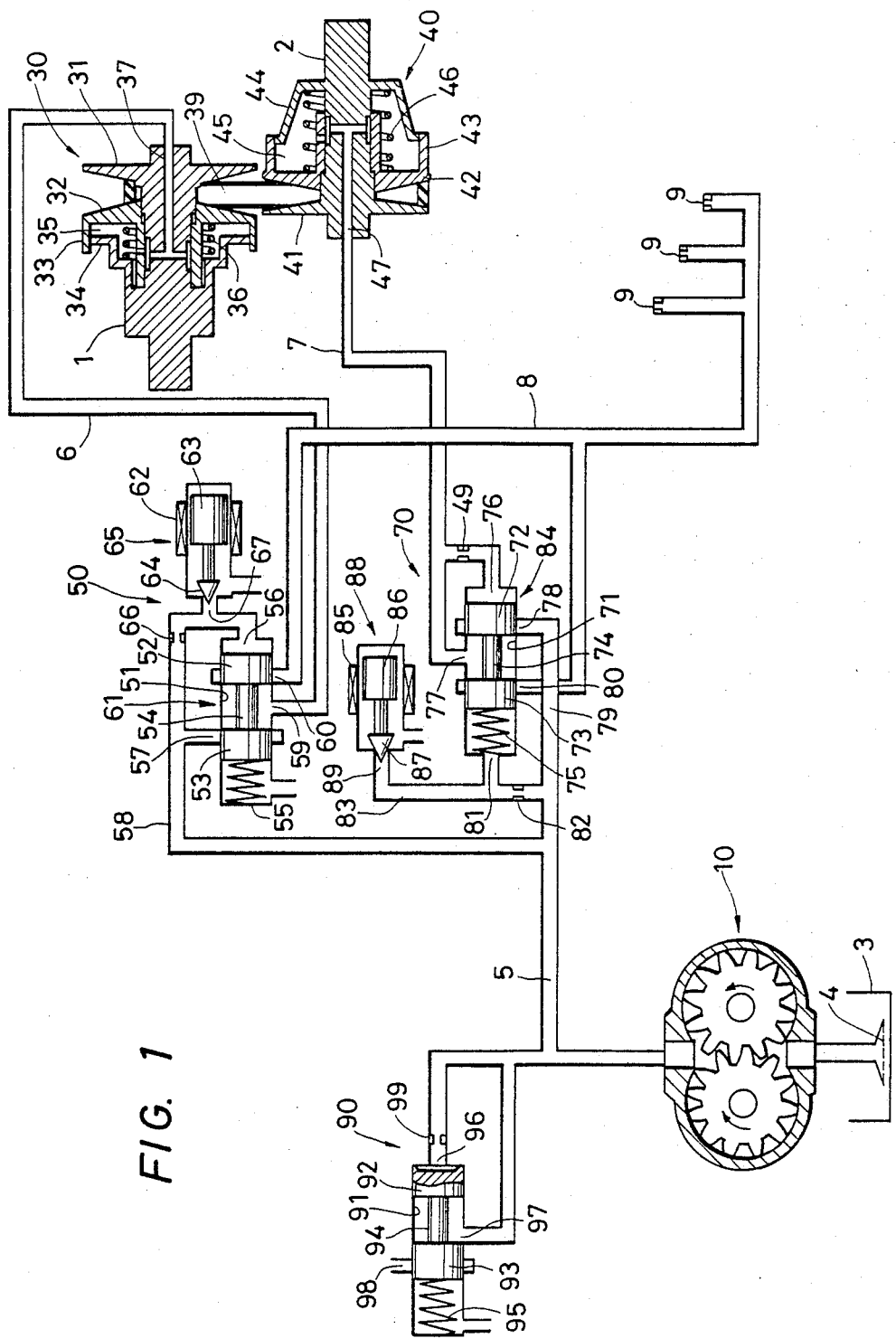
FIG. 1 shows a hydraulic control circuit which is a first embodiment of the present invention.

FIG. 1 shows a hydraulic control circuit which is a first embodiment of the present invention. The driving pulley 30 of a continuously or infinitely variable transmission is provided on an input shaft 1 coupled to the output shaft (not shown in the drawing) of a prime mover i.e., automotive engine. The driving pulley 30 comprises a fixed member or sheave 31 secured to the input shaft 1, a movable member or sheave 32 provided so that it is slidable in the axial direction of the input shaft 1 and is rotated together therewith, a cylinder 33 secured to the movable member 32 coaxially with the input shaft 1, a piston 34 secured to the input shaft 1 and liquid tightly fitted to the inside circumferential surface of the cylinder 33, a cylinder chamber 35 defined between the cylinder 33 and the piston 34, and a spring 36 provided in the cylinder chamber 35 and resiliently deformed in such a direction as to push the movable member 32 toward the fixed member 31. An oil passage 37 for supplying pressure fluid to the cylinder chamber 35 is provided in the input shaft 1 along the axis thereof. The driven pulley 40 of the continuously variable transmission is provided on an output shaft 2. The driven pulley 40 comprises a fixed member or sheave 41 secured to the output shaft 2, a movable member or sheave 42 provided so that it is slidable in the axial diretion of the output shaft 2 and is rotated together therewith, a cylinder 43 secured to the movable member 42 coaxially with the output shaft 2, a piston 44 secured to the output shaft 2 and liquid-tightly fitted to the inside circumferential surface of the cylinder 43, a cylinder chamber 45 defined among the movable member 42, the cylinder 43 and the piston 44, and a spring 46 provided in the cylinder chamber 45 and resiliently deformed in such a direction as to push the movable member 42 toward the fixed member 41. An oil passage 47 for supplying pressure fluid to the cylinder chamber 45 is provided in the output shaft 2 along the axis thereof. The fixed members 31 and 41 and movable members 32 and 42 of the pulleys 30 and 40 have convex conical surfaces which face each other and whose vertexes are on the axes of gyration of the fixed and the movable members, so that the pulleys 30 and 40 have grooves which are shaped as V on the axial sectons containing the axes of gyration of the pulleys and across which the conical surfaces face each other. An endless belt 39 is laid in the grooves. The belt 39 is an endless rubber belt having such a trapezoidal cross section that both the sides of the cross section have the same inclination angle as the conical surfaces of the fixed members 31 and 41 and the movable members 32 and 42. Instead of that, the endless belt 39 may be made of metal plates having the same trapezoidal cross section and endlessly coupled to each other by a chain or a thin metal sheet. When the pressure oil is introduced into the cylinder chambers 35 and 45 of the pulleys 30 and 40, the endless belt 39 is clamped between the fixed and the movable members of the pulleys by forces equal to the products of the pressure of the oil and the effective cross-sectional areas of the pistons in the cylinder chambers 35 and 45, so that the endless belt 39 is frictionally engaged on the pulleys 30 and 40 in the running positions of the belt thereon, in which the thrusts exerted on the belt by the pulleys balance with each other. The springs 36 and 46 function to impart, to the fixed and the movable members or sheaves, such minimum clamp forces as to prevent the endless belt 39 from sagging when the pressure in the cylinder chambers 35 and 45 is discharged therefrom.

The hydraulic control circuit for supplying the pressure oil to the cylinder chambers 35 and 45 of the pulleys 30 and 40 comprises a pump 10 which sucks working oil out of a tank 3 through a filter 4 and supplies the pressure oil to a main oil passage 5, a relief valve 90 which performs control to keep the oil pressure in the main oil passage 5 from exceeding a set level, a first control valve 50 provided between the main oil passage 5 and a first oil passage 6 connected to an oil passage 57 connected to the cylinder chamber 35 of the driving pulley 30, a second control valve 70 provided between the main oil passage 5 and a second oil passage 7 connected to an oil passage 47 connected to the cylinder chamber 45 of the driven pulley 40, and a third oil passage 8 for applying back pressure to the first and the second control valves 50 and 70.

The pump 10 is driven by the prime mover. Since the pump 10 shown in FIG. 1 is a conventional gear pump, it is not described in detail herein.

The relief valve 90 comprises a spool 94 having two lands 92 and 93 and fitted in a cylindrical valve chamber 91, and a spring 95 provided in the valve chamber 91 to resiliently urge the spool 94 in one direction along the axis thereof. The relief valve 90 is connected to the main oil passage 5 through both a port 96 provided at one end of the valve chamber 91, with which the land 92 is brought into contact by the resilient force of the spring 95, and a port 97 which is provided in a position beside the valve chamber 91 and is not closed by the two lands 92 and 93. The relief valve 90 is connectd to a drain passage extending to the tank 3, through a port 98 which is provided in a position beside the valve chamber 91 and whose open cross-sectional area is controlled by displacing the land 93. The spool 84 of the relief valve 90 is moved in the axial direction thereof depending on the balance of the force of the spring 95 and a force based on the oil pressure acting from the main oil passage 5 to the land 92 of the spool 94 through an orifice 99 and the port 96. When the pressure in the main oil passage 5 has become excessive, the spool 94 is moved against the force of the spring 95 so as to connect the port 97 to the port 98 to reduce the pressure in the main oil passage 5.

The first control valve 50 comprises a control valve section 61 and a solenoid valve section 65, which includes a solenoid 62, a movable iron core 63, which is moved by an attractive force proportional to a control current Ivi applied to the solenoid 62, and a conical valve element 64, which is provided at one end of the movable iron core 63. The control valve section 61 includes a spool 54 having two lands 52 and 53 and fitted in a cylindrical valve chamber 51; a spring 55 provided in the valve chamber 51 to resiliently urge the spool 54 in one direction along the axis thereof; a port 56 provided at one end of the valve chamber 51, with which the land 52 is brought into contact by the resilient force of the spring 55; a port 57 provided in a position beside the valve chamber 51 so that the open cross-sectional area of the port 57 is controlled by displacing the land 53; and a port 59 provided in a position beside the valve chamber 51 so that the open cross-sectional area of the port 59 is not controlled by either of the lands 52 and 53 when the spool 54 is moved. The ports 56 and 57 are connected to the main oil passage 5 through a ramified oil passage 58. The port 59 is connected to the first oil passage 6, and connected to the third oil passage 8 through a port 60 provided in a position beside the valve chamber 51 so that the open cross-sectional area of the port 60 is controlled by displacing the land 52.

A port 67 opened into the ramified oil passage 58 between the port 57 and an orifice 66 provided in the ramified oil passage 58 and located near the port 56 is connected to the tank 3 while the open cross-sectional area of the port 67 is controlled by the conical valve element 64 of the solenoid valve section 65 so that the attractive force proportional to the control current Ivi and a force based on the pressure of working oil acting to the conical valve element 64 balance with each other. The third oil passage 8 is provided with orifices 9 through which the passage 8 is connected to the tank 3. The back pressure, for which a pressure difference is produced by the orifices 9, is maintained in the third oil passage 8.

The spool 54 of the first control valve 50 is put into a position in which the force of the spring 55 and a force acting to the spool 54 and correspondng to the product of the pressure reception area of the head of the land 52 of the spool 54 and the pressure of working oil acting to that head on the basis of the pressure acting to the port 56 of the control valve section 61 and determined by the position of the conical valve element 64 of the solenoid valve section 65. For that reason, when the control pressure in the main oil passage 5 is constant and the force acting to the land 52 of the spool 54 is low enough, the land 53 closes the port 57 so that the pressure in the cylinder chamber 35 of the driving pulley 30 is discharged therefrom through the oil passage 37, the first oil passage 6, the valve chamber 51 and the third oil passage 8. When the attractive force acting to the movable iron core 63 is made strong by altering the control current Ivi applied to the solenoid 62, the opening area of the port 67 is changed by a movement of the conical valve element 64. The movement of valve element 64 is decided by the balance between an electromagnetic force generated by the current and a hydraulic force on a conical surface of said element 64. The pressure between the orifice 66 and a chamber 56 in the first control valve section 61 changes in proportion to the current Ivi, and the pressure in the chamber 56 is controlled by the current. At that time, the force acting to the end of the land 52 of the spool 54 is increased, the open cross-sectional area of the port 60 is reduced by the land 52. and the other land 53 of the spool 54 starts opening the port 57 to gradually increase the cross-sectional area of the port 57 connected to the valve chamber 51. As a result, the control pressure in the main oil passage 5 acts so that working oil is supplied to the cylinder chamber 35 of the driving pulley 30 at a flow rate determined by the open cross-sectional areas of the ports 60 and 57.

The second control valve 70 comprises a control valve section 84 and a solenoid valve section 88, which includes a solenoid 85, a movable iron core 86, which is moved by an attractive force proportional to a control current Ipo applied to the solenoid 85, and a conical valve element 87 provided at one end of the movable iron core 86. The control valve section 84 includes a spool 74 having two lands 72 and 73 and fitted in a cylindrical valve chamber 71; a spring 75 provided in the valve chamber 71 to resiliently urge the spool 74 in one direction along the axis thereof; a port 76 provided at one end of the valve chamber 71, with which the land 72 is brought into contact by the resilient force of the spring 75; a port 77 provided in a position beside the valve chamber 71 so that the open cross-sectional area of the port 77 is not controlled by either of the lands 72 and 73 when the spool 74 is moved; a port 78 provided in a position beside the valve chamber 71 so that the open cross-sectional area of the port 78 is controlled by the land 72 of the spool 74; a port 80 provided in a position beside the valve chamber 71 so that the open cross-sectional area of the port 80 is controlled by displacing the land 73 of the spool 74; and a port 81 provided at the other end of the valve chamber 71. The ports 76 and 77 are connected to the second oil passage 7. The port 78 is connected to the main oil passage 5 through a ramified oil passage 79. The port 80 is connected to the third oil passage 8. The port 81 is connected to a ramified oil passage 83 ramified from the main oil passage 5 through an orifice 82. A port 89 provided at the end of the ramified oil passage 83 is connected to the tank 3 while the open cross-sectional area of the port 89 is controlled by the conical valve element 87 of the solenoid valve section 88 so that the attractive force proportional to the control current Ipo and a force based on the pressure acting to the pressure reception surface of the conical valve element 86 balance with each other. The port 76 of the control valve portion 84 is connected to the second oil passage 7 through an orifice 49.

The pressure of the working oil in the cylinder chamber 45 of the driven pulley 40 can be regulated by the second control valve 70 nearly in proportion to the control current Ipo to the solenoid 85, independently of the quantity of the working oil supplied to the cylinder chamber 45. The position of the spool 74 is determined depending on the balance of a force equal to the product of the pressure reception area of the land 72 of the spool 74 and the pressure acting to the head of the land 72 and a force equal to the product of the pressure reception area of the other land 73 of the spool 74 and the pressure acting to the head of the land 73. The pressure acting to the head of the land 73 is controlled in proportion to the attractive force determined by the control current Ipo applied to the solenoid 85 of the solenoid valve section 88. When the attractive force is increased, the open cross-sectional area of the port 89 is reduced so that the pressure acting to the pressure reception surface of the conical valve element 87 is heightened. At that time, the force acting to the head of the land 73 of the spool 74 is increased, the open cross-sectional area of the port 78 is augmented by the land 72, and the open cross-sectional area of the port 80 is reduced by the land 73, so that the working oil is supplied to the cylinder chamber 45 of the driven pulley 40 at a flow rate determined by the open cross-sectional areas of the ports 78 and 88. At that time, the pressure in the cylinder chamber 45 is fed back to one end of the spool 74 of the control valve section 84 to control the pressure in the second oil passage 7 so that the sum of the force of the spring 75 acting to the other end of the spool 74 and a force based on the pressure in the ramified oil passage 83 controlled by the solenoid valve section 88 balances with a force based on the fed-back pressure. The force of the spring 75 is set so that the pressure in the cylinder chamber 45 is kept at the minimum when the control current Ipo is zero or nearly zero.

Figure 2:
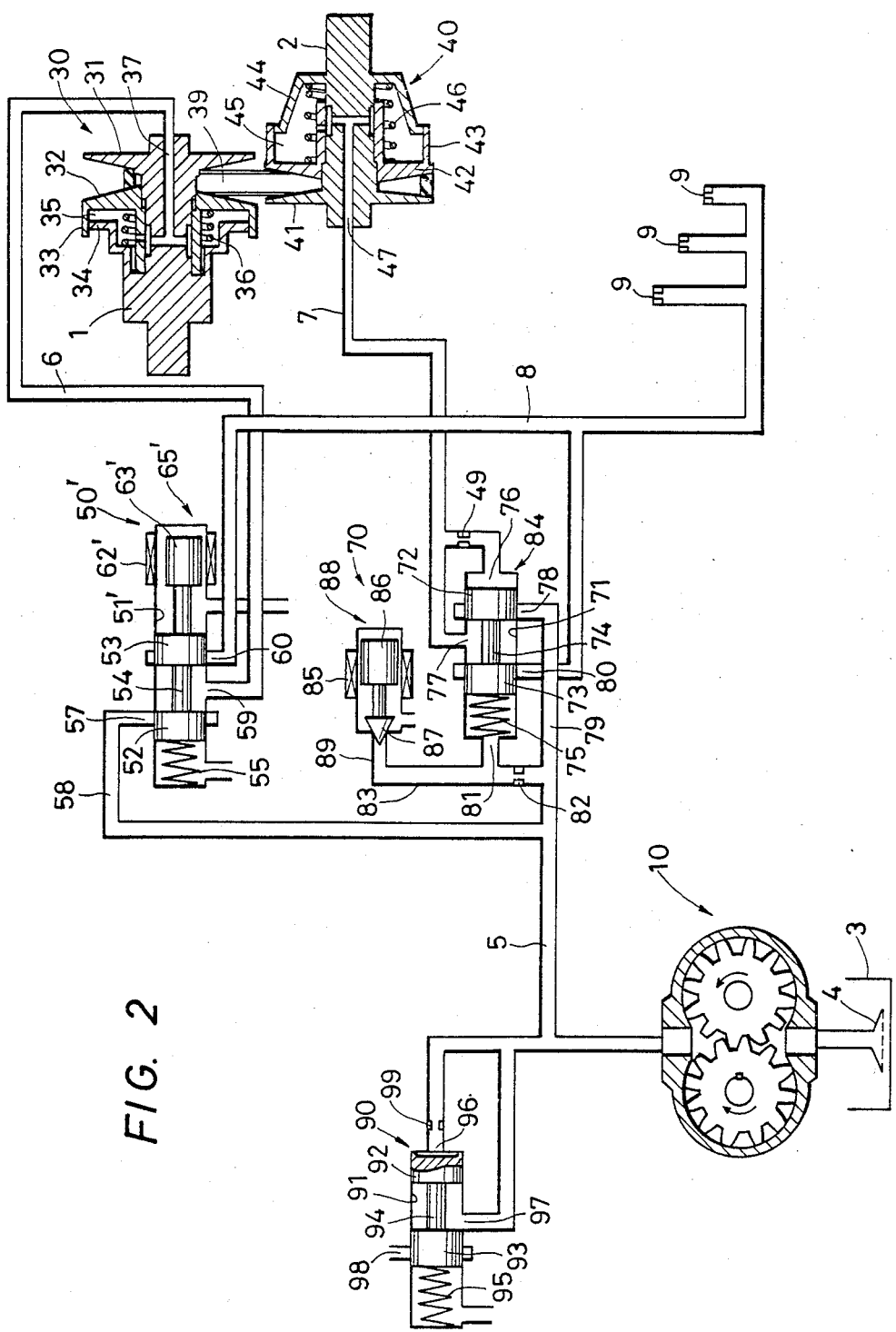
FIG. 2 shows a modification of the hydraulic control circuit.

FIG. 2 show a hydraulic control circuit which is a modification of the hydraulic control circuit shown in FIG. 1. As for the hydrauic control circuit shown in FIG. 2, only the construction of a first control valve 50' differs from that of the first control valve 50 shown in FIG. 1. A spool 54' having two lands 52 and 53 is coupled to the movable iron core 63' of a solenoid valve section 65' by a coupling bar in a valve chamber 51'. The solenoid 62' of the solenoid valve section 65' surrounds the valve chamber 51'. While the spool 54 of the first control valve 50 shown in FIG. 1 is moved depending on the balance of the force of spring 55 acting to the head of the land 53 and the force based on the pressure acting to the head of the other land 52, to control the pressure into the cylinder chamber 35 of the driving pulley 30, the spool 54' of the first control valve 50' shown in FIG. 2 is moved depending on the balance of the force of a spring 55 acting to the spring 54' and the attractive force of the solenoid valve section 65' acting to the spool 54', to control the pressure in the cylinder chamber 35 of a driving pulley 30. With the modification shown in FIG. 2, the quantity of the working oil consumed because of the opening of the port 67 by the solenoid valve section 65 in the first embodiment is reduced. The relationship between the lands 52 and 53 of the spool 54' and ports 57, 59 and 60, which is for controlling the pressure in the cylinder chamber in the modification shown in FIG. 2, is completely the same as that between the lands and the ports, which is for controlling the pressure in the cylinder chamber in the first embodiment shown in FIG. 1.

The first embodiment and the modification and appropriate to a machine tool, a conveyor or the like, the input shaft 1 of which is driven by an electric motor. If the first embodiment and the modification are to be used for a vehicle, the input shaft is connected to the output shaft of a fluid transmission mechanism such as a fluid coupling.

As described above, the first control valves 50 and 50' and the second control valve 70 function so that the flow rate and pressure of the working oil supplied to the cylinder chambers 35 and 45 of the driving and the driven pulleys 30 and 40 are controlled in terms of the magnitudes of the control currents Iv and Ipo applied to the solenoid valve sections 65, 65' and 88 provided in the first and the second control valves. The electric control of the first and the second control valves 50, 50' and 70 is described hereinafter.

Figure 3:
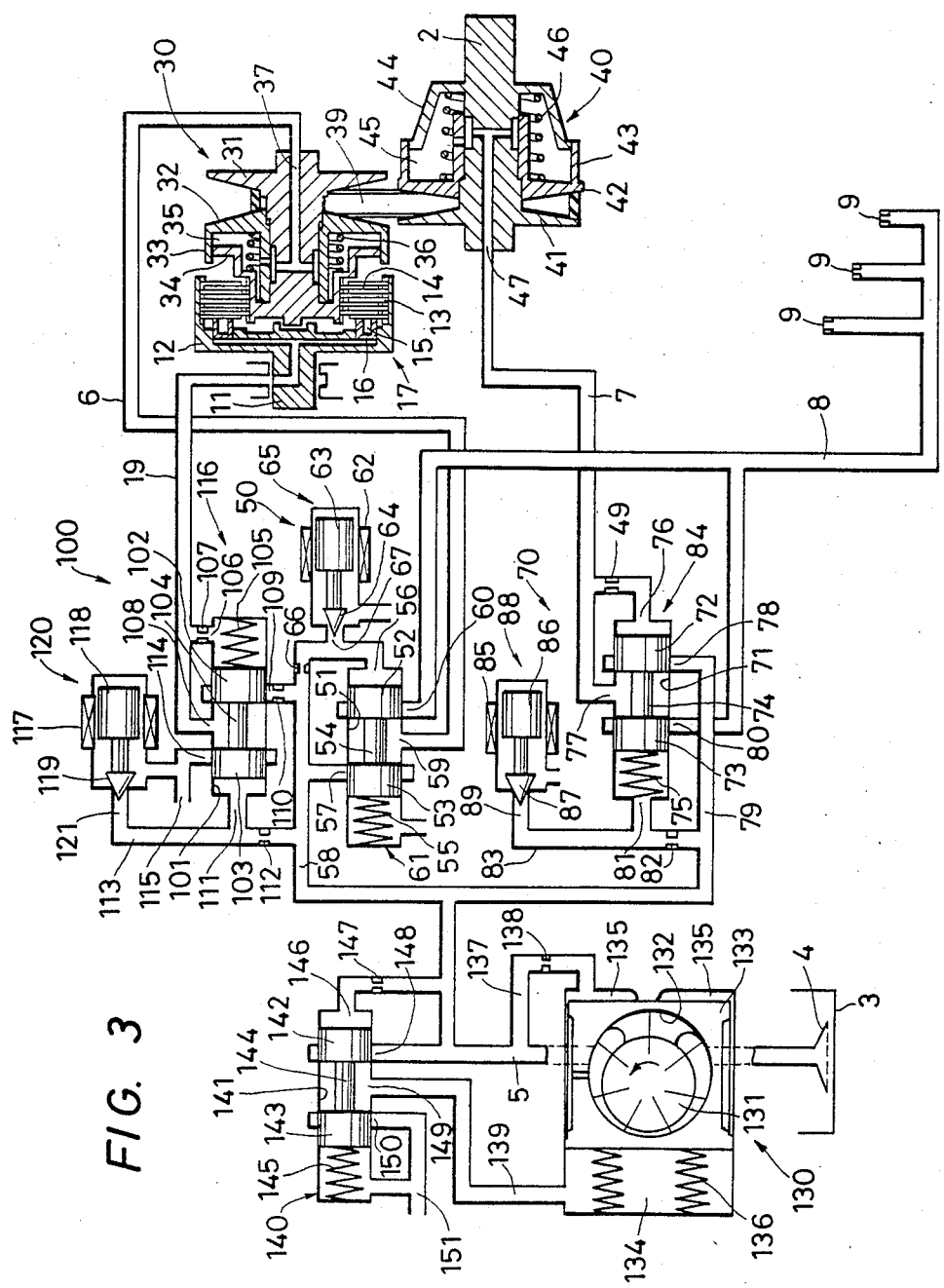
FIG. 3 shows a hydraulic control circuit which is a second embodiment of the present invention.

FIG. 3 shows a hydraulic control circuit which is a second embodiment of the present invention. The difference between the first and the second embodiments of the present invention is that a clutch is provided for the variable transmission, a third control valve for regulating the clutch is provided, and the pump is a variable-displacement pump. The same portions of the second embodiment as those of the first embodiment are given the same reference symbols in FIG. 3 and not described for themselves hereinafter.

In the second embodiment, an input shaft 1 is disposed coaxially with the output shaft of a prime mover or with a shaft 11 coupled to the output shaft. A conventional multiple-disk clutch 17 is composed of annular pressure plates 13 spline-coupled to the inside circumferential surface of a flange 12, which is rotated together with the output shaft 11, annular friction plates 14 spline-coupled to the outside circumferential surface of the input shaft 1, a piston 15 movable in the axial direction thereof relative to the flange 12, and a cylinder chamber 16 defined between the piston 15 and the flange 12. The clutch 17 is regulated by a third control valve 100.

The third control valve 100 comprises a control valve section 116 and a solenoid valve section 120, which includes a solenoid 117, a movable iron core 118, which is moved by an attractive force proportional to a control current Ipc applied to the solenoid 117, and a conical valve element 119 provided at one end of the movable iron core 118. The control valve section 116 includes a spool 104 having two lands 102 and 103 and fitted in a cylindrical valve chamber 101; a spring 104 provided in the valve chamber 101 and located in contact with the land 102 to resiliently urge the spool 104 in one direction along the axis thereof; a port 106 provided at one end of the valve chamber 101; a port 108 provided in a position beside the valve chamber 101 so that the open cross-sectional area of the port 108 is not controlled by either of the lands 102 and 103 when the spool 104 is moved; a port 109 provided in a position beside the valve chamber 101 so that the open cross-sectional area of the port 109 is controlled by displacing the land 102 of the spool 1-4; a port 11 provided at the other end of the valve chamber 101, with which the land 103 is brought into contact by the resilient force of the spring 105; and a port 114 provided in a position beside the valve chamber 101 so that the open cross-sectional area of the port 114 is controlled by moving the spool 103. The port 106 is connected to the cylinder chamber 16 of the clutch 117 through an orifice 107 and a fourth oil passage 19. The port 108 is connected to the cylinder chamber of the clutch 17 through the fourth oil passage 19. The port 109 is connected through an orifice 110 to a ramified oil passage 58 extending from a main oil passage 5 connected to a first control valve 50. The port 111 is connected to an oil passage 113 connected to the ramified oil passage 58 through an orifice 112. The port 114 is connected to a tank 3 through an oil passage 115.

A port 121 provided at the end of the oil passage 113 is connected to the oil passage 115 while the open cross-sectional area of the port 121 is controlled by the conical valve element 119 of the solenoid valve section 120 so that the attractive force corresponding to the control current Ipc and a force based on the pressure of working oil acting to the conical valve element 119 balance with each other.

When the control current Ipc applied to the solenoid 118 of the solenoid valve section 120 of the third control valve 100 is large enough for the conical valve element 119 to close the port 121, the pressure in the oil passage 113 goes high and acts to the head of the land 103 of the spool 104 through the port 111 to compress the spring 105 to open the port 109 to supply oil of control pressure from the ramified passage 58 to the cylinder chamber 16 of the clutch 17 through the port 109, the valve chamber 101 and the fourth oil passage 19, thus engaging the clutch 17. The pressure in the fourth oil passage is inroduced into the valve chamber 101 through the orifice 107 and the port 106 so that the pressure acts as feedback pressure to the head of the land 102. As a result, the spool 104 os the control valve section 116 is put into such a position that a force based on the pressure in the oil passage 113 acting to the land 103, a force based on the feedback pressure acting to the land 102 and the force of the spring 107 balance with each other. In addition, the pressure in the cylinder chamber 16 of the clutch 17 is controlled to a level corresponding to the control current Ipc applied to the solenoid 117 of the solenoid valve section 120.

When the spool 104 is in its neutral position, the ports 109 and 114 are closed by the lands 102 and 103 to inhibit the inflow and outflow of pressure oil so as to maintain the pressure in the fourth oil passage 19.

When the control current Ipc is decreased below a prescribed level or to the vicinity of zero. the pressure in the oil passage 113 drops so as to move the spool 104 by the force of the spring 105 to open the port 114 with the land 103 as the port 109 remains closed. As a result, the pressure oil in the fourth oil passage 19 is drained out of it to the oil passage 115, so that the clutch 17 is disengaged.

A vane-type rotary pump 130 has a rotor 131 fitted with vanes inserted into a plurality of radial grooves. The rotor 131 is rotated eccentrically to the center of a rotor chamber 132 having a circular cross section. A pump frame 133 having the rotor chamber 132 is slidable in a direction in a casing (not shown in the drawing) so that the eccentricity between the center of gyration of the rotor 131 and the center of the rotor chamber 132 can be chanbed within a range from zero to a desired maximum value so as to vary the discharge quantity of the pump 130. The pump 130 is thus constructed as a variable-displacement pump. The pump 130 is combined with a capacity control valve 140 so that the control pressure in the main oil passage 5 is always kept at a prescribed level.

The casing of the pump 130 is provided with a first and a second pressure chamber 134 and 135 at both the sides of the direction of sliding of the pump frame 133. A spring 136 is provided in the first pressure chamber 134 to apply a force to the pump frame 133 in such a direction as to slide the pump frame. The pump frame 133 is put into such a position that the sum of the force of the spring 136 and the product of the pressure reception area of the pump frame 133 and oil pressure applied to the first pressure chamber 134 balances with the product of the pressure reception area of the pump frame 133 and oil pressure applied to the second pressure chamber 135.

The pump 130 sucks working oil out of the tank 3 through a filter 4, and supplies pressure oil to the main oil passage 5. Pump discharge pressure is applied to the second pressure chamber 135 through an oil passage 137 ramified from the main oil passage 5 and provided with an orifice 138. The first pressure chamber 134 is connected to the capacity control valve 140 through an oil passage 139.

The capacity control valve 140 comprises a spool 144 having two lands 142 and 143 and fitted in a cylindrical valve chamber 141; a spring 145 provided in the valve chamber 141 to resiliently urge the spool 144 in one direction along the axis thereof; a port 146 provided at one end of the valve chamber 141, with which the land 142 is brought into contact by the resilient force of the spring 145; and a port 150 provided at a position beside the valve chamber 141 so that the open cross-sectional area of the port 150 is controlled by the land 143. The port 146 is connected to the main oil passage 5 through an orifice 147. Pressure oil in the main oil passage 5 is applied to the head of the port 146. The pressure oil in the main oil passage 5 is controlled and introduced into the valve chamber 141 between the lands 142 and 143 through a port 148 provided in a position beside the valve chamber 141 so that the open cross-sectional area of the port 148 is controlled by the land 142 when the spool 144 is moved. The pressure oil between the lands 142 and 143 is supplied to the oil passage 139 through a port 149 provided in a position beside the valve chamber 141 so that the open cross-sectional area of the port 149 is not controlled by either of the lands 142 and 143 when the spool 144 is moved. The port 150 is connected to an oil passage 151 connected to the tank 3. A chamber, which is defined at the other end of the valve chamber 141 and in which the spring 145 is housed, is connected to the oil passage 151.

The capacity control valve 140 is moved to such a position that a force equal to the product of the pressure reception area of the land 142 of the spool 144 and the pressure of pressure oil supplied from the main oil passage 5 and acting to the head of the land 142 balance with the force of the spring 145 acting to the other land 143 of the spool 144. When the pressure in the main oil passage 5 has dropped, the spool 144 is moved by the force of the spring 145 to cause the land 142 to open the port 148 to supply the pressure oil out of the main oil passage 5 into the first pressure chamber 134 of the pump 130 through the valve chamber 141, the port 149 and the oil passage 139. When the pressure in the main oil passage 5 has risen again, the spool 144 is moved against the force of the spring 145 to cause the land 142 to close the port 148, and to cause the land 143 to open the port 150 to connect the oil passage 139 to the oil passage 151 to reduce the pressure in the second pressure chamber 134. When the spool 144 is in its neutral position, the ports 148 and 150 are closed by the lands 142 and 143.

The pressure of oil in the main oil passage 5 is always applied to the first pressure chamber 135 of the pump 130. However, the pressure in the second pressure chamber 134 of the pump 130 is increased when the pressure in the main oil passage 5 has dropped, to move the pump frame 133 in such a direction as to increase the eccentricity between the center of gyration of the rotor 131 and the center of the rotor chamber 132. The pressure in the second pressure chamber 134 is decreased when the pressure in the main oil passage 5 has risen again, to move the pump frame 133 in such a direction as to decrease that eccentricity. For these reasons, the pump 130 supplies pressure oil to the main oil passage 5 depending on the consumption of lthe working oil in the main oil passage 5, so that the control pressure in the main oil passage 5 is kept constant.

The second embodiment of the present invention is appropriate to a continuous variable transmission for a vehicle.

The electronic control circuit for electrically controlling the first control valves 50 and 50' and the second control valve 70 of the above-described hydraulic control circuits is now described with reference to FIG. 4. The main part of the electronic control circuit is built in a CVT control unit 400, which receives an aimed revolution speed ratio signal and a clutch control signal as input signals and rotational frequency signals for the driving and the driven pulleys 30 and 40 as feedback signals so as to control the operation of the pulleys and the clutch 20 (only in the second embodiment). The CVT control unit 400 includes a calculation and processing section 410 which is a microcomputer including a CPU, a ROM and a RAM. Two I/O ports 420 and 430 are connected to the CPU of the calculation and processing section 410. A valve drive amplifier 470 is connectd to the I/O port 420 through D/A converters 440 and 450. A two-channel puls counter 460 is connected to the I/O port 130. The clutch control signal and the aimed revolution speed ratio signal $e_r$ are applied from an external main controller 500 to the valve drive amplifier 470 and the I/O port 420 through signal lines 407 and 408. The rotational frequency signals are applied to the channels of the pulse counter 460 through signal lines 403 and 406 from conventional rotational frequency detectors 401, 402, 404 and 405 provided for the driving and the driven pulleys 30 and 40. The rotational frequency detectors comprises disks 401 and 404, which are secured to the rotary shafts of the pulleys 30 and 40 and rotated together therewith, and pickups 402 and 405 facing the disks 401 and 404. The detectors send out the signals having numbers of pulses proportional to the rotational frequencies of the pulleys 30 and 40.

The aimed revolution speed signal $e_r$ is read as an input signal from the main controller 500 into the CPU of the calculation and processing section 410 through the I/O ports 420. The pulse signals corresponding to the rotational frequences of the pulleys 30 and 40 are applied as feedback signals to the channels of the pulse counter 460, which counts the numbers of pulses per unit time and generates binary digital signal indicating the rotational frequencies of the pulleys 30 and 40. The digital signals are alternately read into the CPU of the calculation and processing section 410 through the I/O port 430. The section 410 performs calculation and processing in accordance with a flow chart shown in FIG. 5, so that a digital signal for regulating the direct control valve 50 or 50' for operating the driving pulley 30 and a digital signal for regulating the second control valve 70 for operating the driven pulley 40 as sent out to the D/A converters 440 and 450 through the I/O port 420. The digital signals sent out to the converters 440 and 450 are converted into an analog signal voltage Epi for regulating the first control valve 50 and 50' and an analog signal voltage Epo for regulating the second control valve 70, respectively. The voltages Epi and Epo are applied to the valve drive amplifier 470, to which a signal voltage Epc for regulating the third control valve 120 is applied from the external main controller 500. The amplifier 470 performs the current amplification of the voltages Epi, Epo and Epc and adds dither currents so as to send out control signals Ipc, Ipi and Ipo to the solenoids of the third control vlave 120, the first control valve 50 or 50' and the second control valve 70, respectively.

Figure 5:
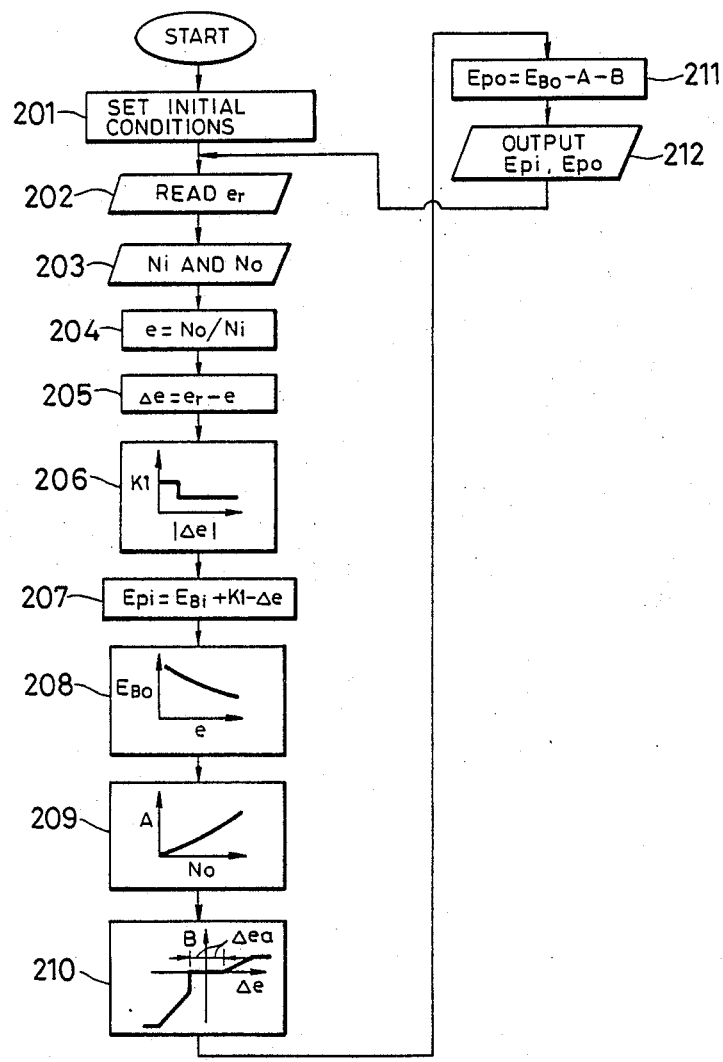
FIG. 5 shows a flow chart of control through the electronic control circuit.

The steps of control by the electronic control circuit are described below (refer to FIG. 5).

201 ... Initial conditions are set.

202 ... An aimed revolution speed ratio $e_r$ instructed from the main controller is read.

203 ... The acutal rotatinal frequencies Ni and No of the driving and the driven pulleys are read from the counter.

204 ... The actual revolution speed ratio $e = No/Ni$ is calculated from the actual rotational frequencies Ni and No loaded in the step 203.

205 ... The differences $\Delta e = e_r - e$ between the actual revolution speed ratio e clculated in the step 204 and the aimed revolution speed ratio $\Delta e_r$ loaded in the step 202 is calculated.

206 ... A proportion constant K1 for calculating a correction quantity for the control signal for the driving pulley on the basis of the difference e calculated in the step 205 is determined through the domain judgement on $\Delta e$. The proportion constant K1 is preset relatively large for a domain in which $\Delta e$ is small, and relatively small for a domain in which $\Delta e$ is large, so that the driving pulley responds with high sensitivity even if the difference $\Delta e$ is very small. The proportion constant K1 is previously stored in the ROM.

207 ... The control signal Epi for the driving pulley is calculated according to a formula $Epi = Ebi + K1 \cdot \Delta E$ by using the difference e and the proportion constant K1 which are calculated in the steps 205 and 206. In the formula, EBi denotes a bias value for maintaining in the neutral position the spool 54 of the first control valve for operating the driving pulley.

208 ... A reference value EBO for the control signal for the driven pulley, which corresponds to the actual revolution speed ratio calculated in the step 204, is determined by map retrieval. The reference valuve EBO is preset to obtain a proper belt tension (surface pressure between the belt and the pulley) depending on the actual revolution speed ratio e. The reference value EBO is previously stored in a map in th ROM.

209 ... A correction value A based on the rotational frequency (centrifugal force) of the driven pulley is determined for the control signal for the driven pulley in terms of its actual rotational frequency No loaded in the step 203, by retrieving a map previously stored in the ROM.

210 ... A response improving correction valuve B for improving the speed change response as to the speed ratio difference $\Delta e$ calculated in the step 205 is calculated by domain judgement on the difference $\Delta e$ and by the use of a linear equation or the like. The response improving correction value B is preset by a prescribed linear equation or the like depending on the domain of $\Delta e$ when the difference $\Delta e$ has gone out of a prescribed range of $\pm ea$.

211 ... The control signal Epo for the driven pulley is calculated according to a formular $Epo = EBO - A - B$ by using the reference value EBO, the correctioon value A and the response improving correction value B which are calculated in the steps 208, 209 and 210.

212 ... The control signals Epi and Epo for the driving and the driven pulleys, which are calculated in the steps 207 and 211, are sent out to the valve drive amplifier 470. After that, processing is returned to the step 202.

Figure 4:
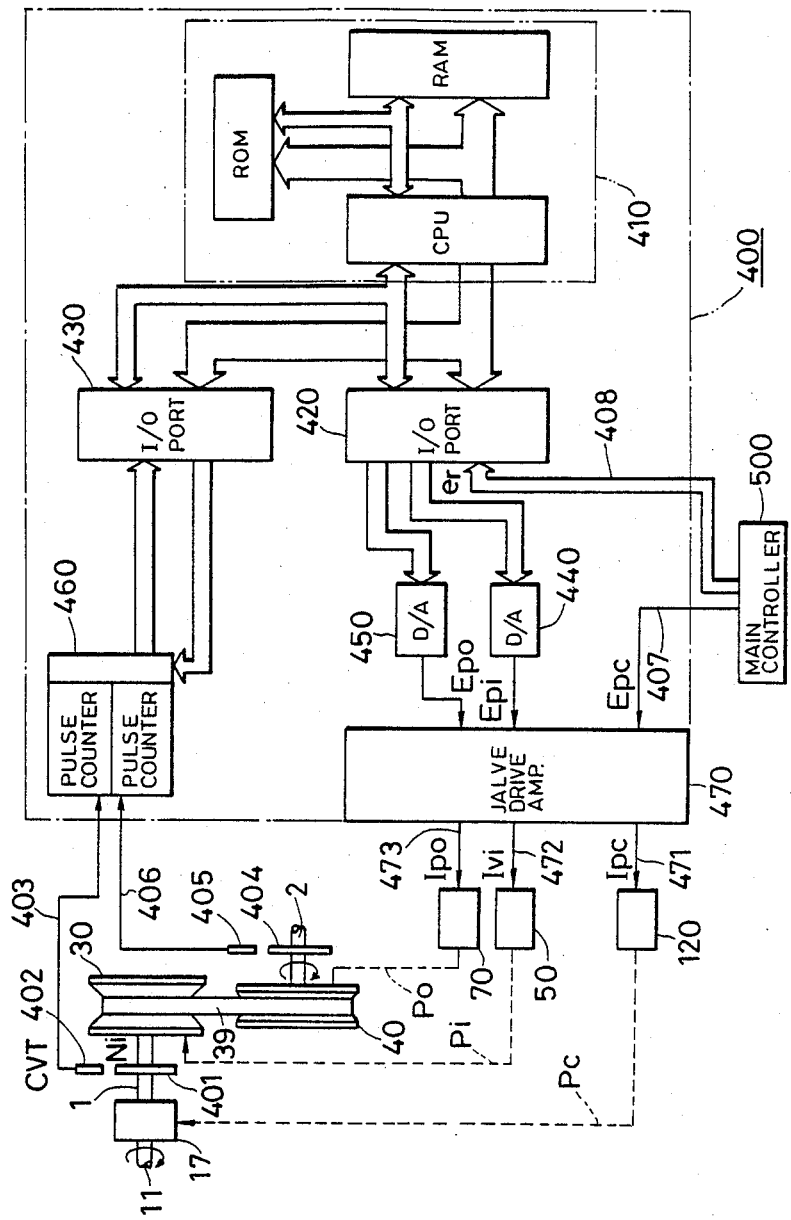
FIG. 4 shows an electronic control circuit which is an embodiment of the present invention.
Figure 6:
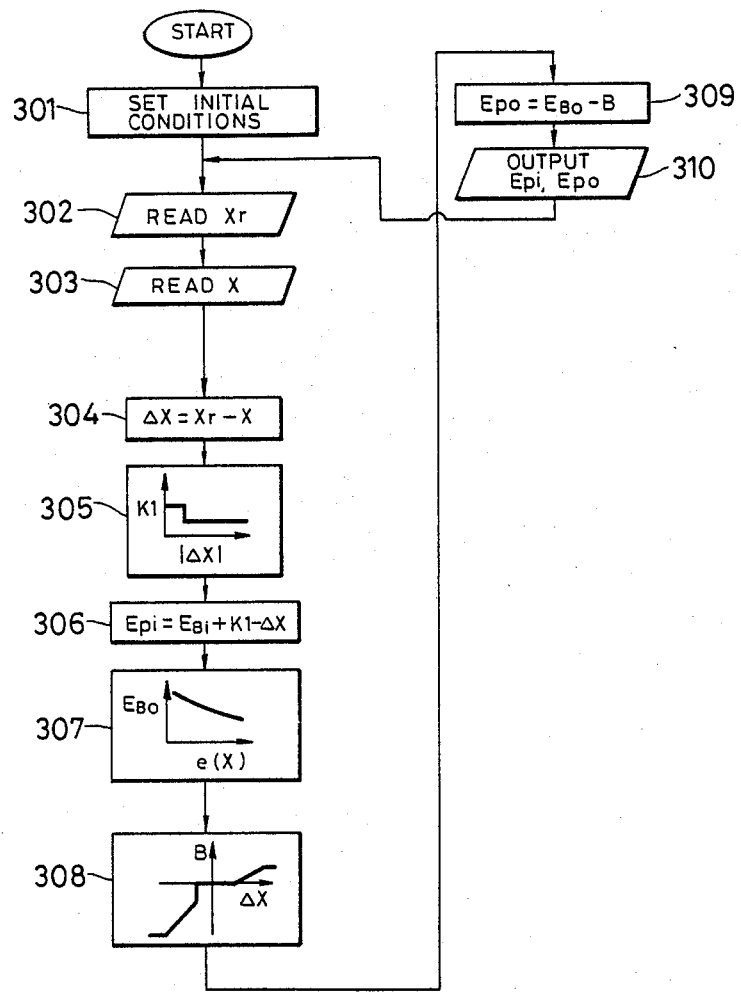
FIG. 6 shows a flow chart which is a modification of that shown in FIG. 5.

FIG. 6 shows another flow chart of calculation and processing with the use of the electronic control circuit shown in FIG. 4. In the flow chart shown in FIG. 5, the revolution speed ratio between the driving and the driven pulleys is calculated and compared with the aimed revolution speed ration to provide feedback information. However, in the flow chart shown in FIG. 6 the quantity X of displacement of the movable member, which belongs to the driving or driven pulley and whose displacement quantity X corresponds ot the above-mentioned revolution speed ratio, is detected by a displacement sensor, a pattern of aimed displacement quantity Xr corresponding to the aimed revolution speed ratio of previously stored, ad control is performed as to the difference between the displacement quantity X detected by the displacement sensor and the aimed displacement quantity Xr. In the calculation and processing method shown in FIG. 6, the resolving power for the difference at the time of slow rotation, especially at the time of starting of a vehicle, is made higher than in the other calculation and processing method which is shown in FIG. 5 and in which the rotational frequency is detected by pulses. For that reason, the instability of control is eliminated by the method shown in FIG. 6, so that the efficiency of the control is enhanced.

In an embodiment of the present invention, a first spool provided in a first control valve is disposed in an oil passage which is for supplying working oil from a pressure oil source to a first cylinder provided in a driving pulley, so that when the first spool is to be moved depending on the magnitude of a first electric control signal corresponding to the difference between an actual value and an aimed value and applied from an electronic control circuit to a control mechanism, a degree of oil passage opening which corresponds to the magnitude of the first electric control signal is set to supply the working oil from the pressure oil source to the first cylinder. As a result, the first spool is moved depending on the difference between the actual value corresponding to the actual revolution speed ratio, so as to control the thrust of the driving pulley to a level corresponding to the aimed value. A second spool provided in a second control valve is disposed in an oil passage which is for supplying working oil from the pressure oil source to a second cylinder provided in the driven pulley, so that when the second spool is to be moved depending on a second electric control signal made of the sum of both an electric signal corresponding to the actual value and applied from the electronic control circuit and an electric signal corresponding to the above-mentioned difference, a degree of oil passage opening which corresponds to the magnitude of the second electric control signal is set to supply the working oil from the pressure oil source to the second cylinder. As a result, not only a thrust necessary to maintain the actual revolution speed ratio but also a thrust corresponding to the difference between the actual value and the aimed value are imparted to the driven pulley, so that the response in speed change to the aimed value is made very good.

In another embodiment of the present invention, means for detecting the revolution speeds of driving and driven pulleys are provided in conjunction with an electronic control circuit. A first electric control signal corresponding to the difference between the actual revolution speed ratio between the pulleys and an aimed revolution speed ratio read out from a predetermined pattern of aimed revolution speed ratio is applied to regulate the flow rate of working oil by a first control valve. An electric signal corresponding to the sum of both a control reference quantity predetermined depending on the change in the actual revolution speed ratio and a response improving correction quantity predetermined depending on the change in the difference between the actual revolution speed ratio and the aimed revolution speed ratio is applied to regulate the pressure or working oil by a second control valve. As a result, the delay in speed change response is reduced, and necessary minimum contact surface pressure is maintined between an endless belt and each of the pulleys in the operation of a continuously variable transmission at a fixed revolution speed ratio. For that reason, the size and weight of the continuously variable transmission can be reduced.

The pattern of aimed speed ratio is hereinafter described. The equal fuel consumption curve and equal output power curve of an engine are drawn by plotting the revolution speed of the engine along an axis of abscissa and the torque of the output shaft of the engine along an axis of ordinate. A line is drawn on such points on the basis of the equal fuel consumption curve and the equal output power curve that the engine's fuel consumption S equal to the product of the engine's fuel consummption ratio Q ($g/h_p \cdot h$) and output power (hp) is minimized. An optimal fuel consumption output power diagram indicating the operating condition of the engine at the minimum fuel consumption for respective levels of its output power is thus obtained. If a fluid transmission mechanism such as a fluid coupling is provided between the output shaft of the engine and the continuously variable transmission, the optimal fuel consumption output power diagram is obtained by plotting the revolution speed of the input shaft of the fluid transmission mechanism and its output torque along an axis of abscissa and an axis of ordinate, respectively. Since the revolution speed ratio of the continuously variable transmission comprising the driving pulley, the driven pulley and the endless belt wound on both the pulleys is the ratio of the revolution speed of the driving pulley to that of the driven pulley, the optimal fuel consumption output power diagram with the revolution speed ratio as a parameter is obtained by plotting the revolution speed of the driven pulley along the axis of abscissa. In other words, a revolution speed ratio indicating the operating condtion of the engine at the minimum fuel consumption can be read out from the torque of the engine and the revolution speed of the driven pulley of the continuously variable transmission. That revolution speed ratio is referred to as the aimed revolution speed ratio.

When the present invention is applied to a transmission for a motor vehicle, a speed change delay due to a sudden geographical change or the like is avoided, and a speed change instruction is accurately followed up, so that the engine of the vehicle is run at the optimal fuel efficiency. The fuel efficiency of the vehicle is thus enhanced.

We claim:

1. A revolution speed ratio control system for a continuously variable transmission comprising a driving pulley provided on an input shaft; a driven pulley provided on an output shaft disposed in parallel with said input shaft; an endless belt wound on both said pulleys; each of said pulleys comprising a fixed member secured to said input or output shaft and having a conical surface, and a movable member which has a conical surface facing that of said fixed member and is provided so that said movable member is rotated together with said input or output shaft and can be slid on said shaft in the axial direction thereof; and said endless belt has both its oblique side surfaces frictionally engaged with said conical surfaces of said fixed and movable members; an electronic control circuit including a means for calculating the actual revolution speed ratio between said driving and driven pulleys of said transmission, a means for generating a first electric control signal corresponding to the difference between said actual revolution speed ratio and an aimed revolution speed ratio between said pulleys determined by information of the input torque of said input shaft and required torque for said output shaft, and a means for generating a second electric control signal determined by the sum of an electric signal corresponding to said actual revolution speed ratio and an electric signal corresponding to said difference; and a hydraulic control circuit including a pressure oil source, a first cylinder which is provided on said input shaft and supplied with working oil from said pressure oil source to push the movable member of said driving pulley toward the fixed member thereof, a second cylinder which is provided on said output shaft and supplied with working oil from said pressure oil source to push the movable member of said driven pulley toward the fixed member thereof, a first control valve which is disposed in an oil passage for connecting said pressure oil source and said first cylinder to each other and acts on the basis of said first electric control signal to control the flow rate of the working oil supplied to or drained from said first cylinder, and a second control valve which is disposed in an oil passage for connecting said pressure oil source and said second cylinder to each other and acts on the basis of said second electric control signal to control the pressure of the working oil supplied to said second cylinder.

2. A revolution speed ratio control system according to claim 1, wherein said hydraulic control circuit comprises the pressure oil source, the first cylinder which is provided on said input shaft and supplied with the working oil from said pressure oil source to push the movable member of said driving pulley toward the fixed member thereof, the second cylinder which is provided on said output shaft and supplied with the working oil from said pressure oil source to push the movable member of said driven pulley toward the fixed member thereof, said first control valve which comprises a first spool and a control mechanism for controlling the quantity of movement of said first spool depending on the magnitude of said first electric control signal, and which has said first spool disposed in the oil passage for connecting said pressure oil source and said first cylinder to each other, to control the flow rate of the working oil supplied from said pressure oil source to said first cylinder or drained from said first cylinder, and said second control valve which comprises a second spool, a control mechanism for applying pressure corresponding to the magnitude of said second electric control signal, to said second spool, and a feedback control oil passage for applying the pressure in said second cylinder to said second spool so as to balance with said pressure corresponding to the magnitude of said second electric control signal, and which has said second spool disposed in the oil passage for connecting said pressure oil source and said second cylinder to each other, to control the pressure of the working oil supplied from said pressure oil source to said second cylinder.

3. A revolution speed ratio control system according to claim 2, wherein said electronic control circuit further comprises means for detecting the revolution speeds of the input and the output shafts of the transmission, a means for sending out said first electric control signal to the first control valve; and a means for sending out said second electric control signal to the second control valve.

4. A revolution speed ratio control system according to the claim 3, wherein a variable-displacement pump equipped with a capacity control valve is provided as the pressure oil source.

5. A revolution speed ratio control system according to claim 4, wherein said variable-displacement pump comprises a vane-type rotary pump having a rotor fitted with vanes inserted into a plurality of radial grooves, said rotor is rotated eccentrically to the center of a rotor chamber having a circular cross section, a pump frame having the rotor chamber being slidable in a direction in a casing so that the eccentricity between the center of gyration of the rotor and the center of the rotor chamber can be changed within a range from zero to a desired maximum value so as to vary the discharge quantity of the pump, and said pump is thus constructed as a variable-displacement pump, and the pump being combined with a capacity control valve so that the control pressure in the main oil passage is always kept at a predetermined level.

6. A revolution speed ratio control system according to claim 5, wherein said capacity control valve comprises a spool having first and second lands and fitted in a cylindrical valve chamber; a spring provided in the valve chamber to resiliently urge the spool in one direction along the axis thereof; a first port provided at one end of the valve chamber, with which the first land is brought into contact by the resilient force of the spring; and a second port provided at a position beside the valve chamber so that the open cross-sectional area of the port is controlled by said first land, said first port is connected to the main oil passage through an orifice, pressure oil in the main oil passage is applied to the first port, said pressure oil in the main oil passage is controlled and introduced into the valve chamber between said first and second lands and through the second port provided in a position beside the valve chamber so that the open cross-sectional area of a fourth port is controlled by the second land when the spool is moved, said pressure oil between said first and second lands and is supplied to the oil passage through a third port provided in a position beside the valve chamber so that the open cross-sectional area of the third port is not controlled by either of said first and second lands when the spool is moved, said fourth port is connected to the tank.

7. A revolution speed ratio control system according to the claim 3, wherein the oil operating area of said first cylinder provided in the driving pulley is 1.1 to 1.6 times as much as that of the second cylinder provided in the driven pulley.

8. A revolution speed ratio control system according to the claim 3 further comprising a friction clutch interposed between the input shaft of the transmission and the output shaft of an engine and the hydraulic control circuit including a third cylinder which is supplied with working oil from the pressure oil source to engage said friction clutch, and a third control valve which comprises a third spool and a control mechanism for controlling the quantity of movement of said third spool by a third electric control signal, and which has said third spool disposed in an oil passage for connecting said pressure oil source and said third cylinder to each other, to control the pressure of the working oil supplied from said pressure oil source to said third cylinder; and the electronic control circuit includes a means for generating said third electric control signal of a magnitude determined by an external signal, and a means for sending out said third electric control signal to said third control valve.

9. A revolution speed ratio control system according to claim 8, wherein said friction clutch comprises a conventional multiple-disk clutch being composed of annular pressure plates spline-coupled to the inside circumferential surface of a flange, which is rotated together with the output shaft, annular friction plates spline-coupled to the outside circumferential surface of the input shaft, a piston movable in the axial direction thereof relative to the flange, and a cylinder chamber defined between the piston and the flange.

10. A revolution speed ratio control system according to claim 8, wherein said third control valve comprises a control valve section and a solenoid valve section, which includes a solenoid, a movable iron core, which is moved by an attractive force proportional to a control current Ipc applied to the solenoid, and a conical valve element provided at one end of the movable iron core, said control valve section includes a spool having first and second lands and fitted in a cylindrical valve chamber; a spring provided in the valve chamber and located in contact with the first land to resiliently urge the spool in one direction along the axis thereof; a first port provided at one end of the valve chamber, a second port provided in a position beside the valve chamber so that the opening area of said second port is not controlled by either of said first and second lands when the spool is moved; a third port provided in a position beside the valve chamber so that the open corss-sectional area of the port is controlled by displacing said first land of the spool by moving the spool; a fourth port provided in a position beside the valve chamber so that the open cross-sectional area of the port is controlled by the second land of the spool; a fifth port provided at the other end of the valve chamber, with which said second land is brought into contact by the resilient force of the spring; said first port is connected to the cylinder chamber of the clutch through an orifice and a fourth oil passage; said second port is connected to the cylinder chamber of the clutch through the fourth oil passage; and third port is connected through an orifice to a ramified oil passage extending from a main oil passage connected to a first control valve; the fourth port is connected to a tank through an oil passage; the fifth port is connected to an oil passage connected to the ramified oil passage through an orifice; and a third control port provided at the end of the oil passage is connected to the oil passage while the open cross-sectional area of said third control port is controlled by the conical valve element of the solenoid valve section so the attractive force corresponding to the control current Ipc and a force based on the pressure of working oil acting to the conical valve element balance with each other.

11. A revolution speed ratio control system according to claim 3, wherein said first control valve comprises a control valve section, a solenoid valve section, which includes a solenoid, a movable iron core, which is moved by an attractive force proportional to a control current Ivi supplied to the solenoid, and a conical valve element, which is provided at one end of the movable iron core, said control valve section comprising a spool having two lands comprising a spring land and a control land and fitted in a cylindrical valve chamber; a spring provided in the valve chamber to resiliently urge the spool in one direction along the axis thereof; a first port provided at one end of the valve chamber, with which the control land is brought into contact by the resilient force of the spring; a second port provided in a position beside the valve chamber so that the open cross-sectional area of said second port is controlled by displacing the spring land; and a third port provided in a position beside the valve chamber so that the open cross-sectional area of the port is not controlled by either of the lands and when the spool is moved, said first and second ports being connected to the main oil passage through a ramified oil passage, said third port being connected to the first oil passage, and connected to the third oil passage through a fourth port provided in a position beside the valve chamber so that the open cross-sectional area of the fourth port is controlled by displacing the control land, a first control port opened into the ramified oil passage, connected to the main oil passage, through an orifice provided in the ramified oil passage and located near the first port being connected to the tank while the open cross-sectional area of the first control port is controlled by the conical valve element of the solenoid valve section so that the attractive force proportional to the control current Ivi and a force based on the pressure of working oil acting to the conical valve element balance with each other, said third oil passage being provided with orifices through which the passage is connected to the tank and the back pressure, for which a pressure difference is produced by the orifices, being maintained in the third oil passage.

12. A revolution speed ratio control system according to claim 11, wherein said first control valve comprises spool having two lands being coupled to the movable iron core of a solenoid valve section by a coupling bar in a valve chamber, and said solenoid of the solenoid valve section surrounds the valve chamber.

13. A revolution speed ratio control system according to claim 3, wherein the second control valve comprises a control valve section and a solenoid valve section, which includes a solenoid, a movable iron core, which is moved by an attractive force proportional to a control current Ipo applied to the solenoid, and a conical valve elemtn provided at one end of the movable iron core, said control valve section comprising a spool having two lands comprising a control land and a feedback land and fitted in a cylindrical valve chamber; a spring provided in the valve chamber to resiliently urge the spool in one direction along the axis thereof; a first port provided at one end of the valve chamber, with which the feedback land is brought into contact by the resilient force of the spring; a second port provided in a position beside the valve chamber so that the open cross-sectional area of said second port is not controlled by either of the lands and when the spool is moved; a third port provided in a position beside the valve chamber so that the open cross-sectional area of said third port is controlled by the feedback land of the spool; a fourth port provided in a position beside the valve chamber so that the open cross-sectional area of said fourth port is controlled by displacing the control land of the spool; and a fifth port provided at the other end of the valve chamber, said first and second ports being connected to the second oil passage, said third port being connected to the main oil passage through a ramified oil passage, said fourth port being connected to the third oil passage, said fifth port is connected to a ramified oil passage ramified from the main oil passage through an orifice, a second control port provided at the end of the ramified oil passage is connected to the tank while the open cross-sectional area of said second control port being controlled by the conical valve element of the solenoid valve section so that the attractive force proportional to the control current Ipo and a force based on the pressure acting to the pressure reception surface of the conical valve element balance with each other.

* * * * *